(12) United States Patent
Botha

(10) Patent No.: US 11,840,884 B2
(45) Date of Patent: Dec. 12, 2023

(54) BLIND SYSTEM AND METHOD OF RETROFITTING A BLIND SYSTEM

(71) Applicant: Rollease Acmeda Pty Ltd, Broadmeadows Victoria (AU)

(72) Inventor: Stefan Botha, Broadmeadows Victoria (AU)

(73) Assignee: Rollease Acmeda Pty Ltd, Broadmeadows (AU)

( * ) Notice: Subject to any disclaimer, the term of this patent is extended or adjusted under 35 U.S.C. 154(b) by 230 days.

(21) Appl. No.: 17/421,261

(22) PCT Filed: Jan. 7, 2020

(86) PCT No.: PCT/AU2020/050007
§ 371 (c)(1),
(2) Date: Jul. 7, 2021

(87) PCT Pub. No.: WO2020/142807
PCT Pub. Date: Jul. 16, 2020

(65) Prior Publication Data
US 2022/0120135 A1    Apr. 21, 2022

(30) Foreign Application Priority Data
Jan. 7, 2019   (AU) ................................ 2019900042

(51) Int. Cl.
*E06B 9/72* (2006.01)
*E06B 9/50* (2006.01)
*H01M 10/46* (2006.01)
*H01M 10/48* (2006.01)
*E06B 9/68* (2006.01)

(52) U.S. Cl.
CPC ................. *E06B 9/72* (2013.01); *E06B 9/50* (2013.01); *H01M 10/46* (2013.01); *H01M 10/488* (2013.01); *E06B 2009/689* (2013.01)

(58) Field of Classification Search
CPC ..... E06B 9/72; E06B 9/70; E06B 9/50; E06B 2009/689; H01M 10/488; H01M 10/46
See application file for complete search history.

(56) References Cited

U.S. PATENT DOCUMENTS

| 6,082,433 | A | * | 7/2000 | Vafaie | ...................... E06B 9/68 160/310 |
| 6,283,190 | B1 | | 9/2001 | Hu et al. | |
| 11,028,641 | B2 | * | 6/2021 | Lei | ........................ F16H 37/041 |

(Continued)

FOREIGN PATENT DOCUMENTS

| EP | 3091170 | 10/2018 |
| KR | 20100113690 | 10/2010 |

(Continued)

Primary Examiner — Beth A Stephan
(74) Attorney, Agent, or Firm — Head, Johnson, Kachigian & Wilkinson, PC

(57) ABSTRACT

Disclosed herein is a blind system. The system includes an elongate rod for supporting a length of fabric. The system includes a motor that is connected to a spindle that is configured to rotate the rod about the longitudinal axis to extend and retract the blind in use. The motor may be disposed at a first end of the rod and may have a recess formed therein that is configured to receive a projecting portion of the support.

10 Claims, 10 Drawing Sheets

(56) References Cited

U.S. PATENT DOCUMENTS

| | | | |
|---|---|---|---|
| 11,643,871 B2* | 5/2023 | Zhou | ........................ E06B 9/42 |
| | | | 160/323.1 |
| 2014/0133019 A1 | 5/2014 | Mullet et al. | |
| 2017/0201140 A1* | 7/2017 | Cole | ....................... E06B 9/171 |
| 2020/0018118 A1* | 1/2020 | Geiger | ..................... A47H 1/13 |

FOREIGN PATENT DOCUMENTS

| WO | WO2009140711 | 11/2009 |
|---|---|---|
| WO | WO2011138556 | 11/2011 |
| WO | WO2018223415 | 12/2018 |

* cited by examiner

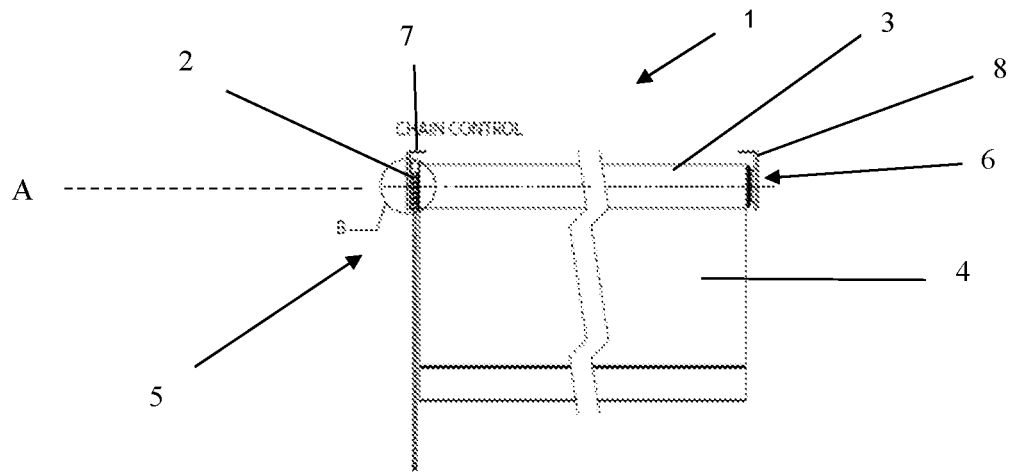
Figure 1a – Prior Art
Figure 1b – Prior Art
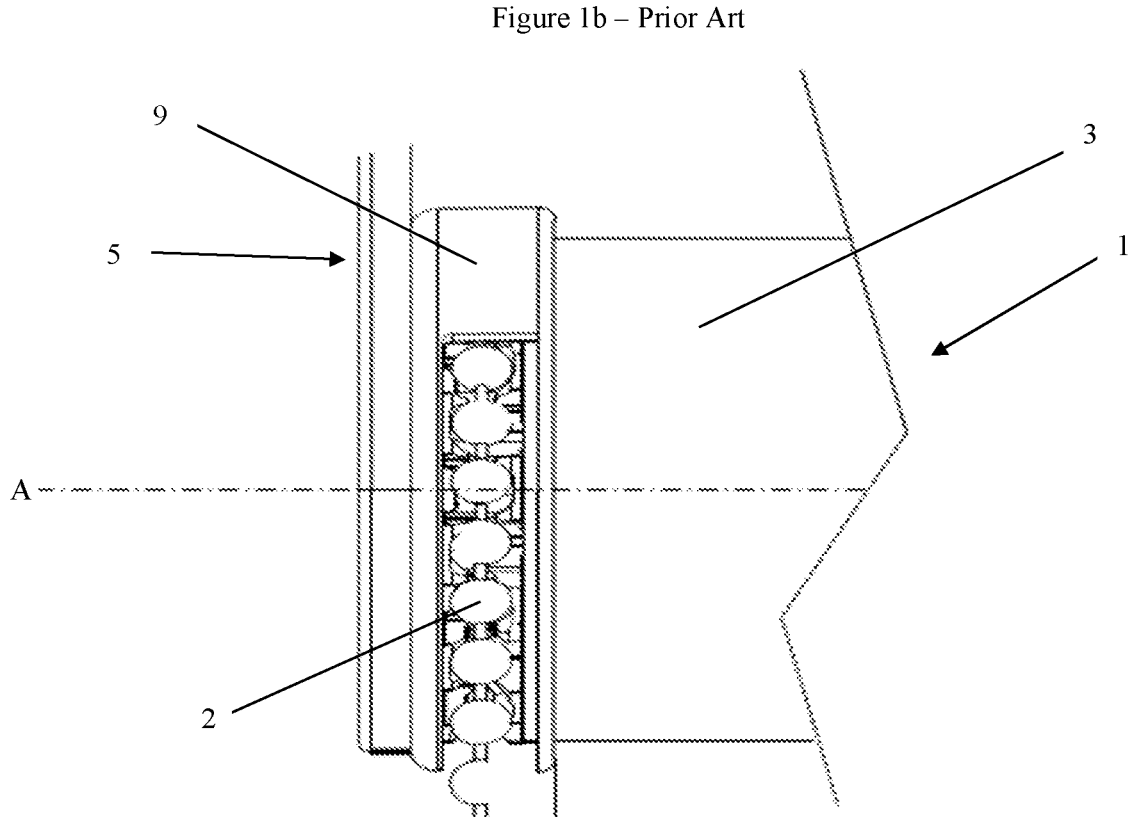

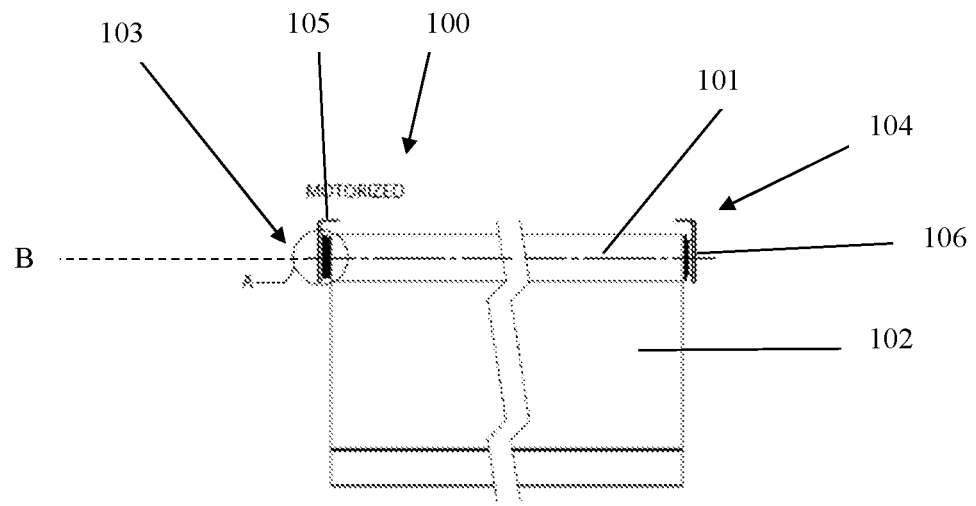
Figure 2a
Figure 2b
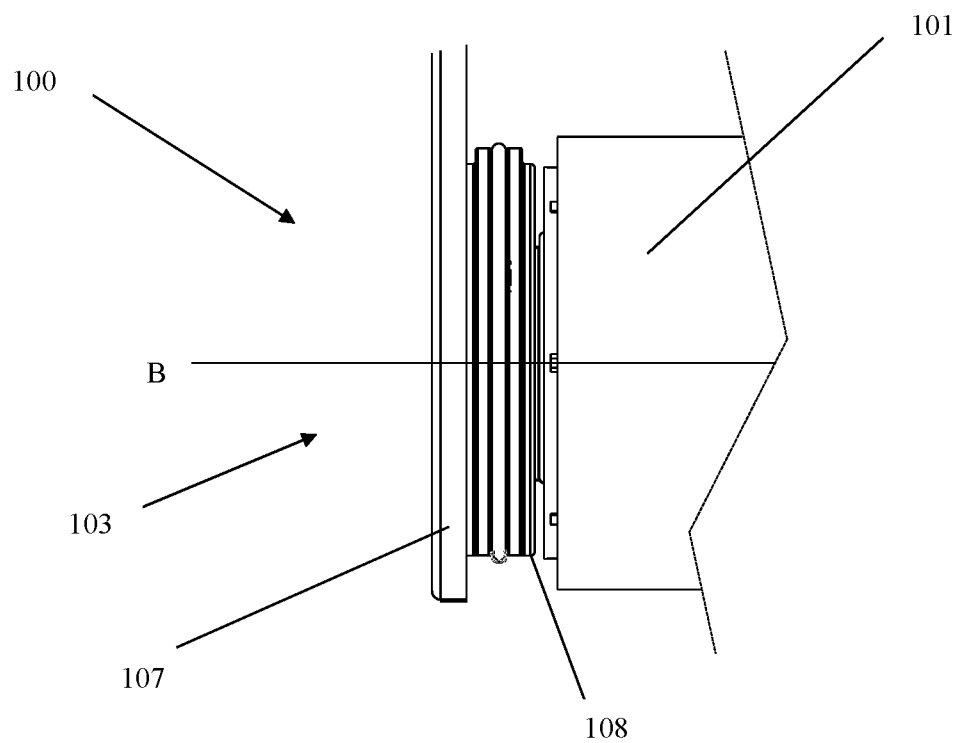

BLIND SYSTEM AND METHOD OF RETROFITTING A BLIND SYSTEM

TECHNICAL FIELD

The disclosure relates to a blind system. The blind system has an elongate rod and a motor configured to rotate the rod to extend and retract a blind. A method of retrofitting a blind system is also disclosed. The method comprises replacing a chain winder with a motor and a support that enables the retrofitted system to be mounted to existing brackets.

BACKGROUND ART

A blind system may be rotatable to, for example, extend and retract a window covering such as a window blind. Such assemblies may include a manually driven chain drive that rotates a drive spindle. The drive spindle is configured to cause the blind system to rotate to retract and extend the blind.

Blind systems may be retrofitted with a winder motor. Retrofitting a blind system with a motor may include replacing the chain drive with a winder motor. Winder motors may be connected to the existing drive spindle. The width of a winder motor may not be the same as the width of the replaced chain drive. As a result, the installer may need to adjust the position of at least one supporting bracket to compensate for the width of the installed motor. This is time consuming for the installer and, depending on the position of the blind, may not always be possible (e.g. where the difference in width is small, it may not be possible to relocate the brackets due to the location of pre-existing mounting apertures in a wall). In some instances, installers may attempt to retrofit a chain driven blind system with a winder motor without adjusting the position of the supporting brackets. This may result in an insufficient connection between the brackets and the blind (e.g. where the connection is threaded, the full thread may not be used to secure the blind to one or both supporting brackets), which may lead to a dangerous installation (e.g. risk of the blind falling).

In this specification, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

SUMMARY

Disclosed herein are a number of improvements to blind systems which may or may not be used in combination with each other. Whilst certain of the improvements are described in combination that is not meant to indicate that those improvements cannot be adopted individually of one another.

In a first improvement, the system may comprise an elongate rod for supporting a blind (e.g. a length of fabric). The rod may extend along a longitudinal axis of the blind system between first and second ends of the rod (e.g. opposing ends of the rod). The first and second ends of the rod may be configured to connect the blind system to first and second brackets (e.g. brackets disposed at the opposing rod ends) respectively to support the blind system on a surface (e.g. a wall). The system may also comprise a support. The support may be connected to the first end of the rod. The support may be configured to mount the first end of the rod to the first bracket. The support may have a head portion and a projecting portion. The projecting portion may be connected to the head portion (e.g. integrally formed with the head portion) and may extend from the head portion along the longitudinal axis towards the second end (e.g. opposing end) of the rod. The system may comprise a motor that is connected to a spindle that is configured to rotate the rod about the longitudinal axis to extend and retract the blind in use. The motor may be disposed at the first end of the rod and may have a recess formed therein that is configured to receive the projecting portion of the support.

In an second improvement, also disclosed herein is a kit for retrofitting a blind system, the blind system comprising an elongate rod for supporting a blind and a spindle configured to rotate the rod, the rod extending along a longitudinal axis of the blind system between first and second ends of the rod, the first and second ends of the rod being configured to connect the blind system to first and second brackets respectively to support the blind system on a surface. The kit may comprise at least one support. The at least one support is able to be connected to the first end of the rod. The at least one support may also be configured to mount the first end of the rod to the first bracket. The at least one support may have a head portion and a projecting portion, the projecting portion being connected to the head portion and extending from the head portion along the longitudinal axis towards the second end of the rod. The kit may comprise a motor able to be connected to the spindle to rotate the rod about the longitudinal axis to extend and retract the blind in use. The motor may be able to be disposed at the first end of the rod and may have a recess formed therein that may be configured to receive the projecting portion of the at least one support.

In another improvement, some forms of the kit comprises a plurality of supports, wherein each of the plurality of supports have varying head portions that are configured to enable one of the plurality of supports to be mounted to the first bracket without having to adjust the position of the first or second bracket on the surface. This arrangement allows for an installer to select the most appropriate support from the plurality of supports to ensure that existing brackets do not need to be re-positioned.

Also disclosed herein is an improved method of retrofitting a blind system. The method may comprise removing the chain winder from the blind system. The method may also comprise connecting a motor to the first end of the rod of the blind system such that the motor is able to rotate the spindle about the longitudinal axis to extend and retract the blind in use. The motor may have an recess formed therein. The method may also comprise mounting a support to the first end of the rod. The support may have a head portion configured to connect the blind system to the first bracket and a projecting portion, the projecting portion being connected to the head portion and extending from the head portion such that it is received by the motor recess.

In some forms, an improved motor is provided which comprises a second recess that extends radially about the longitudinal axis, the second recess being configured to receive an antenna that is able to be wrapped around the motor such that it is positioned in the second recess of the motor. This arrangement allows for the antenna to be housed (completely or partially) within the second recess and manipulated by a user to enhance performance while retaining a clean look and not interfering with the fabric of the window covering.

In some improved forms, a button is disposed in the second recess, wherein the button is configured to turn the motor on and off upon depression of the button by a user. This arrangement reduces the prospect of the button being accidentally pressed and may also means that no device (e.g. a specific tool) is required to press the button.

In some improved forms, the motor comprises a circumferential head within which the second recess is disposed. In some forms, the system may further comprise a cover for the motor, the cover comprising:

a first resilient radially extending circumferential wall adapted to partially encircle the head;

a second resilient radially extending circumferential wall adapted to partially encircle the head; and a third resilient radially extending circumferential wall adapted to partially encircle the head, the third wall being disposed between the first and second walls to define a generally U shaped cross section.

In some forms, the cover is C shaped and adapted to snap fit onto the motor head.

In some forms, the motor comprises a USB charge port that is located on the motor head in a position that remains exposed when the cover is positioned on the motor head. In some forms, the motor head is provided with a planar (flat) section in which the USB charge port is located. In this way, an installer will be able to readily identify the USB port by feeling for that section.

In some forms, the motor is battery powered. In some forms, the motor is continuously powered (e.g. connected to mains power).

Also disclosed herein is an improved system for automating the determination of the battery level of a motor for a blind. The system may comprise an elongate and rotatable rod for supporting a blind. The system may comprise the motor. The motor may be configured to rotate the rod about a longitudinal axis of the rod to extend and retract the blind in use, the blind being extendable from a retracted position, where the blind is wrapped around the rod, to an extended position, where the blind is extended from the rod. The system may comprise a battery configured to supply power to the motor. The system may comprise a processor and memory storing instructions that, when executed by the processor, cause the system to; determine a battery level of the battery; and rotate the rod in dependence on the determined battery level to extend the blind towards a battery level indication position, the battery level indication position being between the extended and retracted position, wherein the battery level indication position indicates to a user the determined battery level.

BRIEF DESCRIPTION OF DRAWINGS

Various embodiments/aspects of the present disclosure will now be described with reference to the following drawings in which, FIGS. 1a-b show a side view (FIG. 1a) and an expanded side view (FIG. 1b) of a prior art blind system;

FIGS. 2a-b show a side view (FIG. 2a) and an expanded side view (FIG. 2b) of a blind system in accordance with the present disclosure;

DETAILED DESCRIPTION

Figure 3:
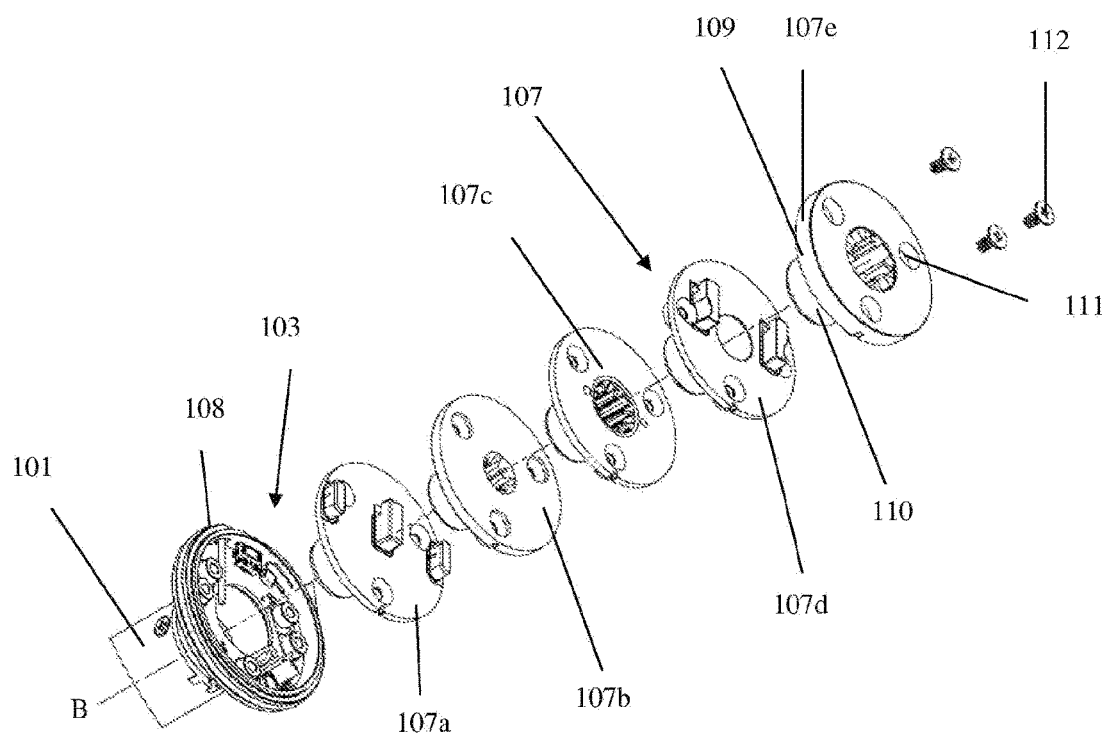
FIG. 3 shows an exploded view of a plurality of adaptors in accordance with the present disclosure.

FIGS. 1a-b show a side view of prior art blind system 1. The prior art blind system 1 includes a chain 2 that is coupled to a rotatable chain drive (not shown) for manual operation of the blind. The blind system 1 includes an elongate rod 3 for supporting a blind, in the form of a window covering 4. The rod 3 extends along a longitudinal axis A of the blind system 1 between first 5 and second 6 opposing ends of the rod 3. The first 5 and second 6 ends of the rod 3 are configured to connect the blind system 1 to first 7 and second 8 brackets respectively to support the blind system 1 on a surface (e.g. on a wall adjacent a window).

The chain drive of the blind system 1 is connected to a spindle (not shown) that extends along the longitudinal axis A. The spindle is configured to rotate the rod 3 about the longitudinal axis A upon manual operation of the chain 2 (e.g. by a user pulling on a length of chain to rotate the chain drive) to extend and retract the window covering 4. The chain drive has a fixed width (i.e. a dimension as measured along the longitudinal axis) that is defined by the width of the chain 2 and the associated housing 9 that connects the blind system 1 to the first bracket 7. The chain drive may be replaced by a winder motor. As will be apparent to the skilled addressee, the width of the retrofitted motor may not be the same as the width of the replaced chain drive. As a result, the installer may need to adjust the position of at least one supporting bracket to compensate for the width of the installed motor.

Referring now to FIGS. 2 to 12, embodiments of a blind system in accordance with the present disclosure will now be described in detail. FIGS. 2a-b show a side view of a blind system 100 in accordance with the present disclosure. The blind system 100 includes an elongate rod 101 for supporting a blind, in the form of a window covering 102. The rod 101 extends along a longitudinal axis B of the blind system 100 between first 103 and second 104 opposing ends of the rod. The first 103 and second 104 ends of the rod 101 are configured to connect the blind system 100 to first 105 and second 106 brackets respectively to support the blind system on a surface (e.g. a wall surface adjacent a window).

The blind system 100 includes a support, in the form of an adaptor 107, that is connected to the first end 103 of the rod 101. The adaptor 107 is configured to mount the first end 103 of the rod 101 to the first bracket 105. The blind system 100 also includes a motor 108 that is connected to the spindle (not shown) that is configured to rotate the rod 101 about the longitudinal axis B to extend and retract the window covering 102 in use.

Figure 4:
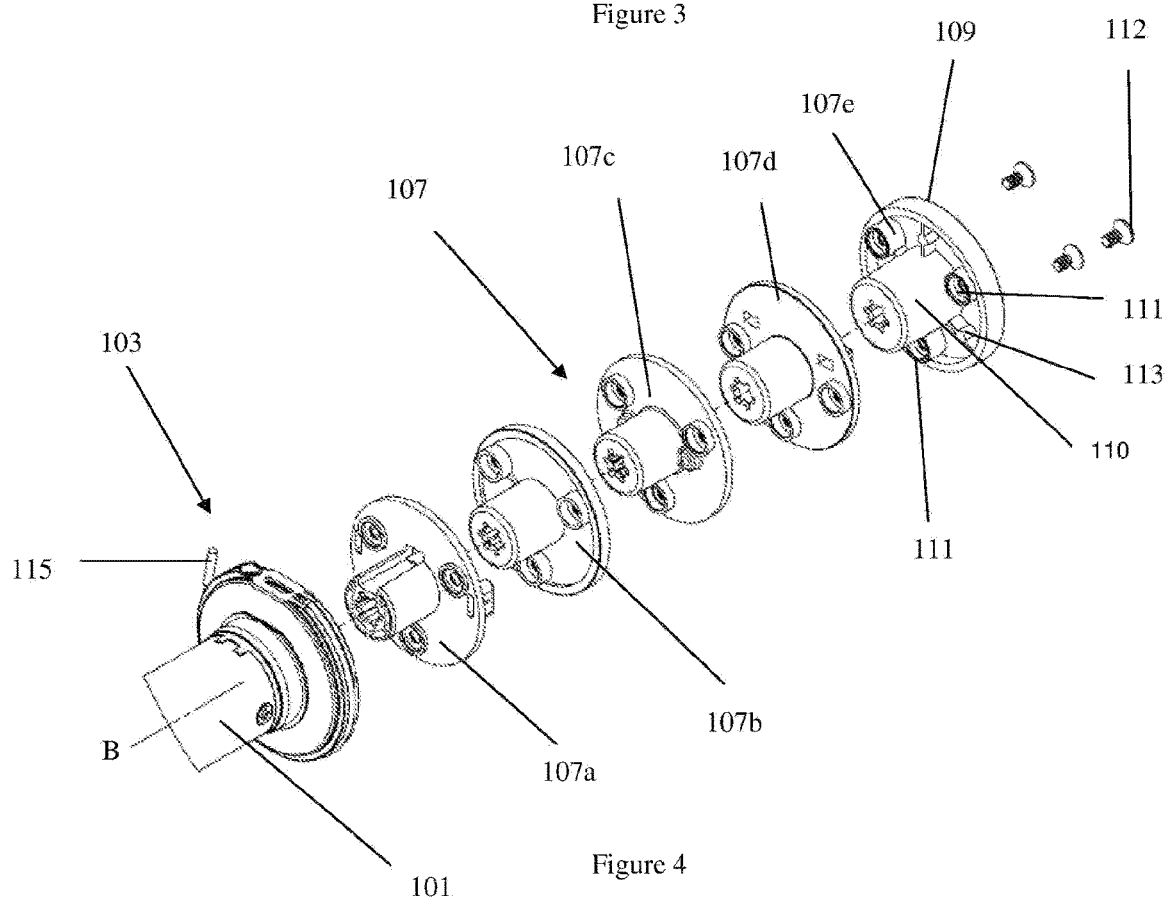
FIG. 4 shows another exploded view of a plurality of adaptors shown in FIG. 3.
Figure 5:
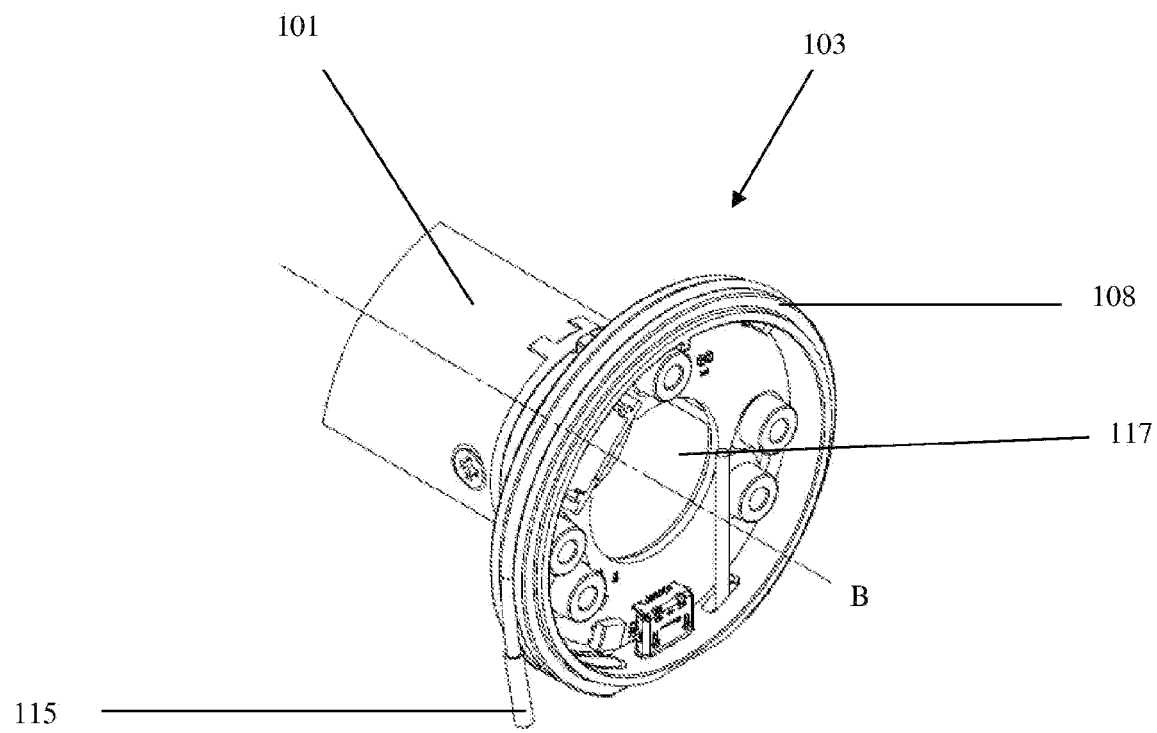
FIG. 5 shows a perspective view of the motor attached to a blind system with the adaptor removed.
Figure 6:
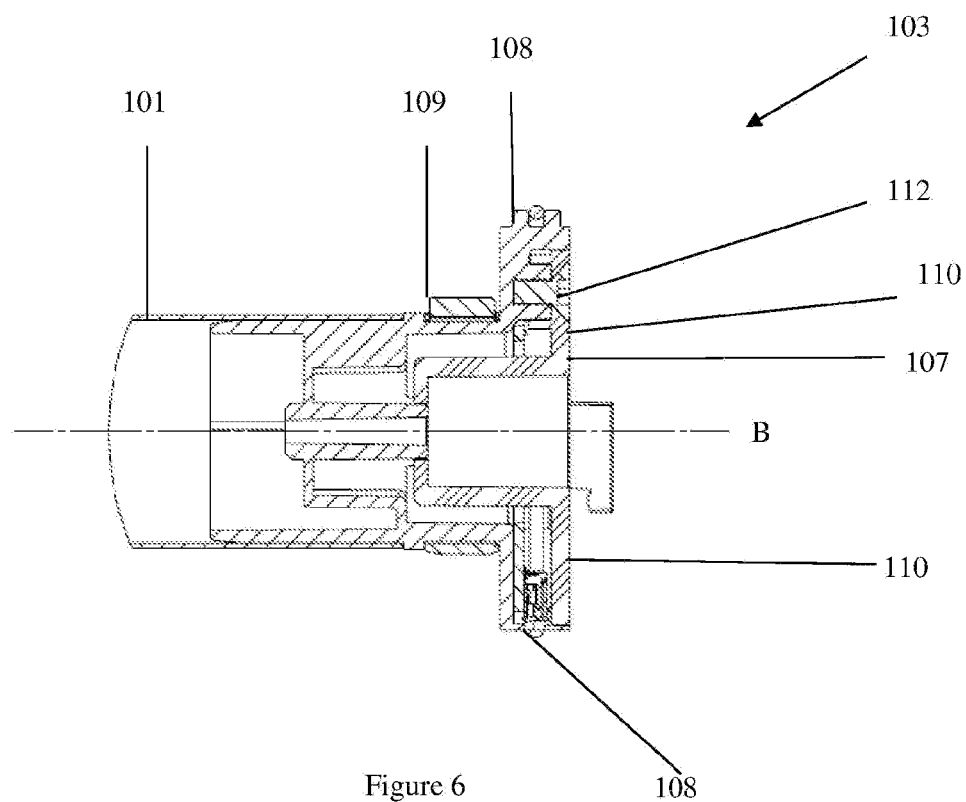
FIG. 6 shows a cross sectional view through an end of the elongate rod of a blind systems with the motor and adaptor mounted to the end.

The adaptor 107 and motor 108 will now be described in further detail with respect to FIGS. 3 and 4. FIGS. 3 and 4 show an exploded view of the first end 103 of the rod 101 and a plurality of adaptors 107*a-e*. The disclosed adaptors 107*a-e* have a different structure to suit different blind systems. The structure of each adaptor 107*a-e* varies, primarily in width along the longitudinal axis B, to allow a seamless retrofit that does not require the position of the supporting brackets (e.g. wall brackets) to be adjusted. The structure of each adaptor 107*a-e* is configured to match the width and mounting arrangement of the chain drive and associated housing that is to be replaced with a winder motor.

Each adaptor 107 has a head portion 109 and a projecting portion 110. The projecting portion 110 is connected to the head portion 109 and extends from the head portion 109 along the longitudinal axis B away from the first end 103 of the rod 101 (i.e. towards the opposing second end the rod—not shown in FIG. 3 or 4). The adaptors 107 disclosed herein allow for a variation in width of between 6.6 mm to 10.6 mm. The variation in width is dependent on the width of the chain drive that is being replaced. As will be evident to the skilled addressee, the width of the adaptor could more or less than the examples provided herein to suit the configuration of the retrofitted blind system. In the detailed embodiment, the head portions 109 and the projecting portions 110 of the adaptors 107*a-e* have a common diameter to suit a common motor. Each adaptor 107*a-e* has a plurality of mounting apertures 111 that are configured to receive a fastener 112 (e.g. a screw) to mount the adaptor 107*a-e* to the blind system 100. If required (e.g. as shown on adaptor 107*e*), the adaptor may include strengthening ribs 113 that extend radially from the longitudinal axis B. In the detailed embodiments, the motor is battery powered. As will be evident to the skilled addressee, in another form, the motor may be continuously powered (e.g. provided with mains power in addition to, or as an alternative to, a battery power source).

The motor 108 will now be described with reference to FIGS. 3 to 8. The motor 108 is connected to a spindle (not shown) that is configured to rotate the rod 101 about the longitudinal axis B to extend and retract the window covering in use. The motor 108 is disposed at the first end 103 of the rod 101. The motor 108 has a recess 117 formed therein that is configured to receive the projecting portion 109 of the adaptor 107.

In use, the motor 108 attaches to an existing bracket 105 that was used previously to support the chain drive. The adaptor 107 determines attachment method (i.e. the method by which the motor 108 is attached to the existing bracket 105). In some forms, a hook type connections system may be implemented between the adaptor 107 and the existing bracket 105 and in some forms a flat through type attachment system may be implemented between the adaptor 107 and the existing bracket 105. A drive (not shown) is connected to the motor 108. The drive includes a keyed connection that allows the motor 108 to fit into and rotate the rod 101.

Figure 7A:
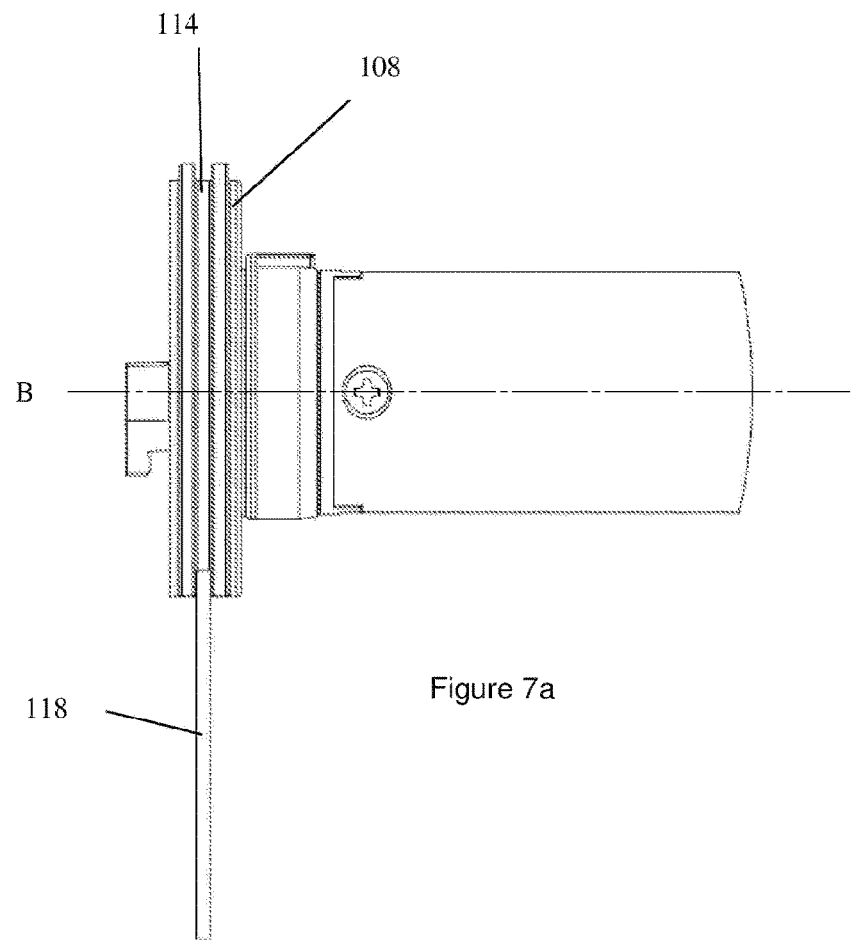
FIGS. 7a-b show side views of the motor with the antenna disconnected (FIG. 7a) and connected (FIG. 7b)
Figure 7B:
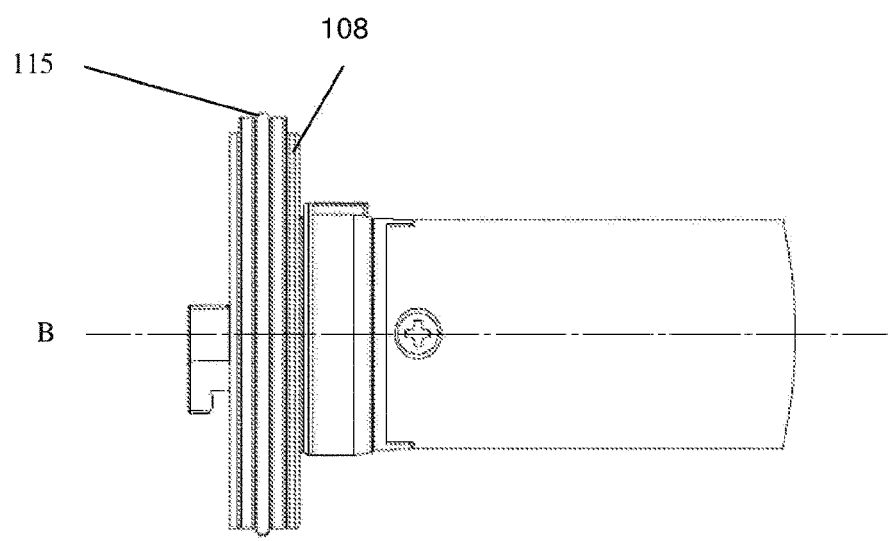

As shown in FIG. 7*a*, the motor 108 includes a further recess 114 that extends radially about the longitudinal axis B (e.g. a circumferential groove). The recess 114 is configured to receive an antenna 115 that is able to be wrapped around the motor 108 such that it is positioned in the recess 114 of the motor 108 (as shown in FIG. 7*b*). The recess 114 allows for an antenna 115 to be secured neatly around the head of the motor 108. The antenna 115 can be completely wrapped around the head of the motor 108 and can also be partially removed (i.e. extend from) the recess 114. As would be evident to the skilled addressee, this arrangement allows for the antenna 115 to be directed (e.g. positioned) to improve radio performance. The recess 114 allows for the antenna 115 to be wrapped around the head and also allows for the antenna 115 to be manipulated and directed to enhance performance while retaining a clean look and not interfering with the fabric of the window covering.

Figure 8:
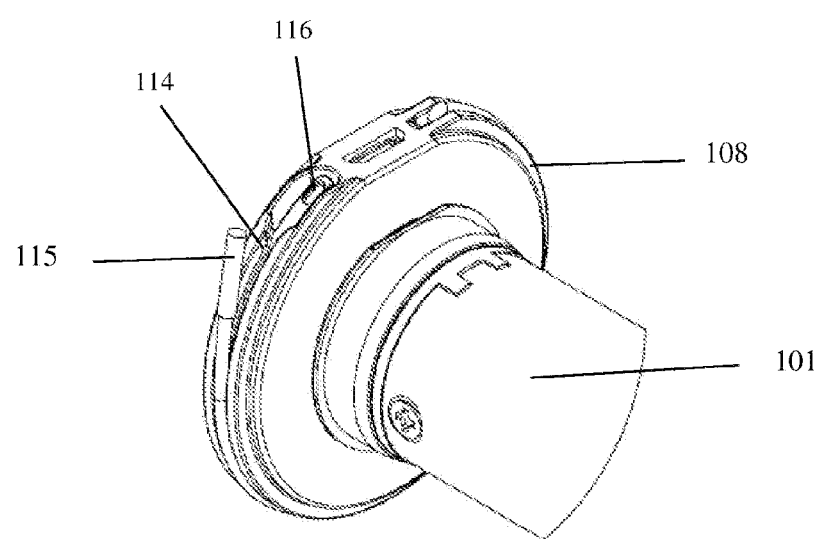
FIG. 8 shows a perspective view of the bottom of the motor head.

As is shown in FIG. 8, a button 116 is disposed in the recess 114 of the motor 108. The button 116 is configured to turn the motor 108 on and off upon depression of the button 116 by a user. The location of the button 116 in the recess 114 reduces the prospect of the button 116 being accidentally pressed (e.g. by a user with a finger) and means that no device (e.g. a paper clip or special tool) is required to press the button 116.

Figure 9A:
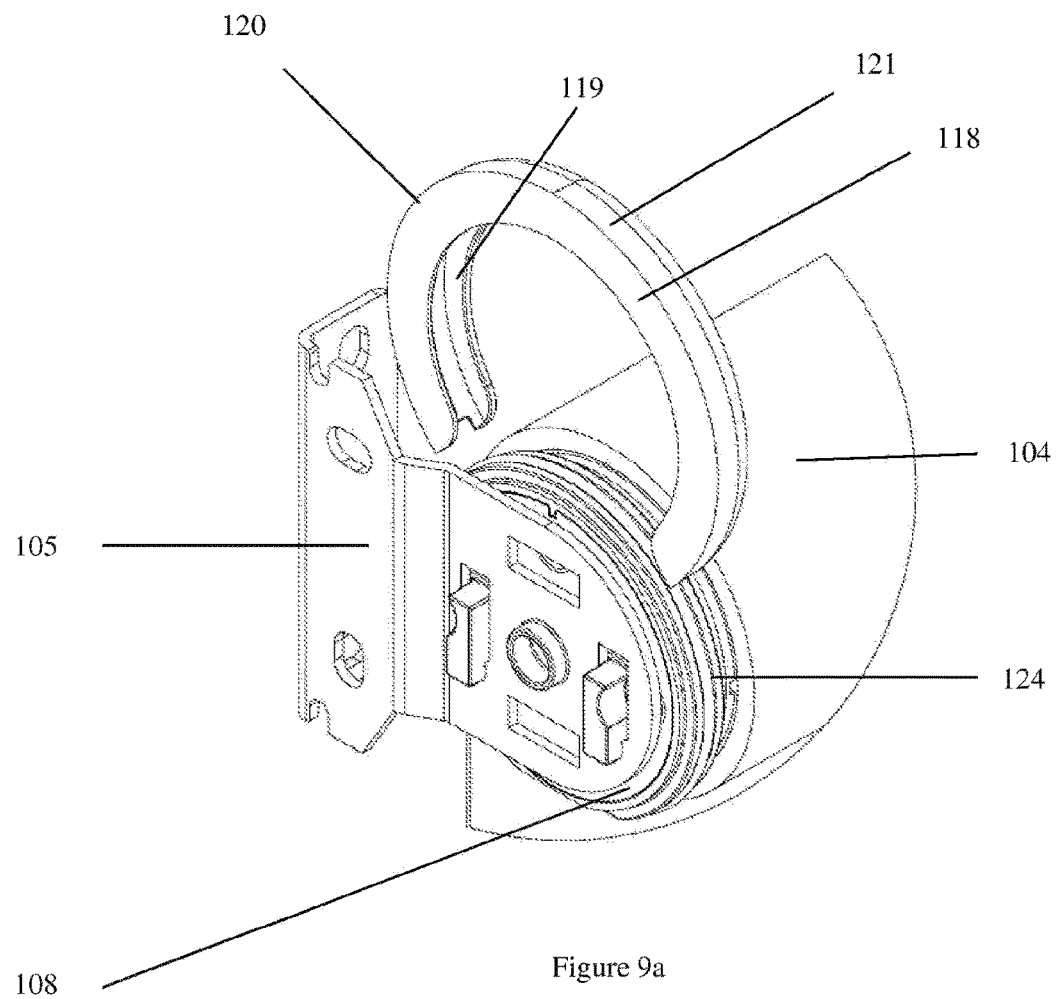
FIGS. 9a-b show perspective and cross-sectional side views of the motor with the cover disconnected (FIG. 9a) and connected (FIG. 9b)
Figure 9B:
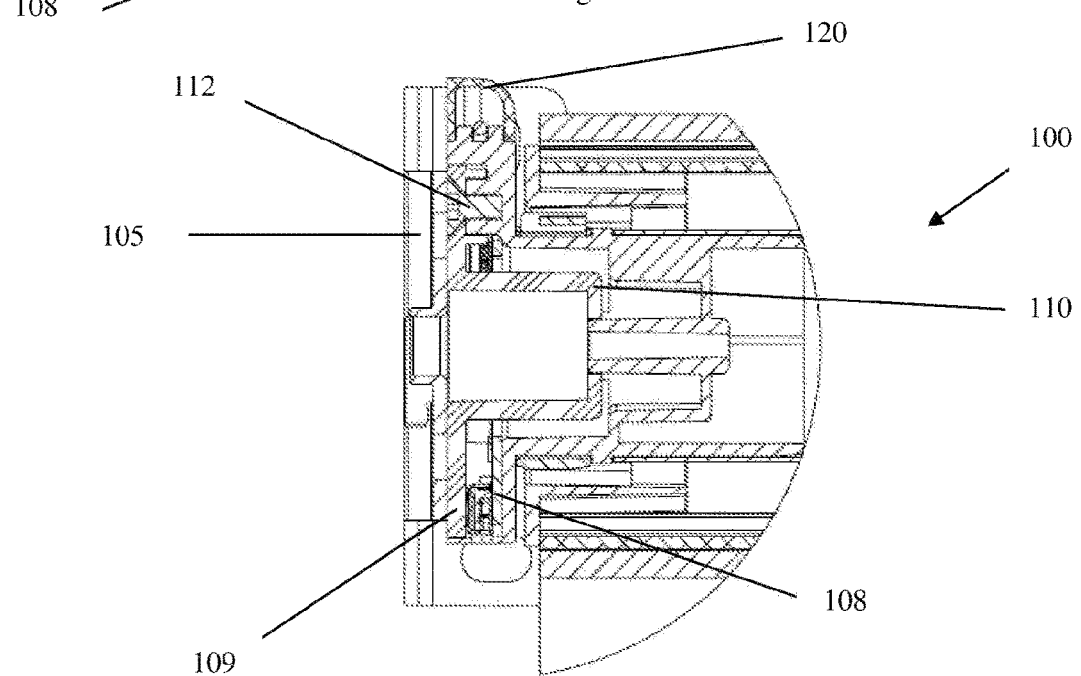
Figure 10:
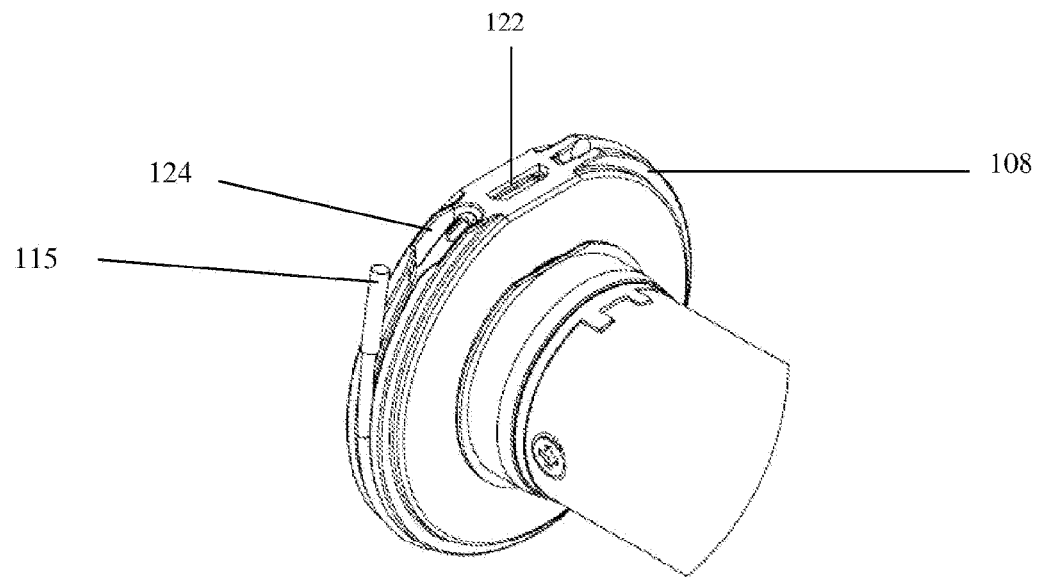
FIG. 10 shows a perspective view of the motor.
Figure 11:
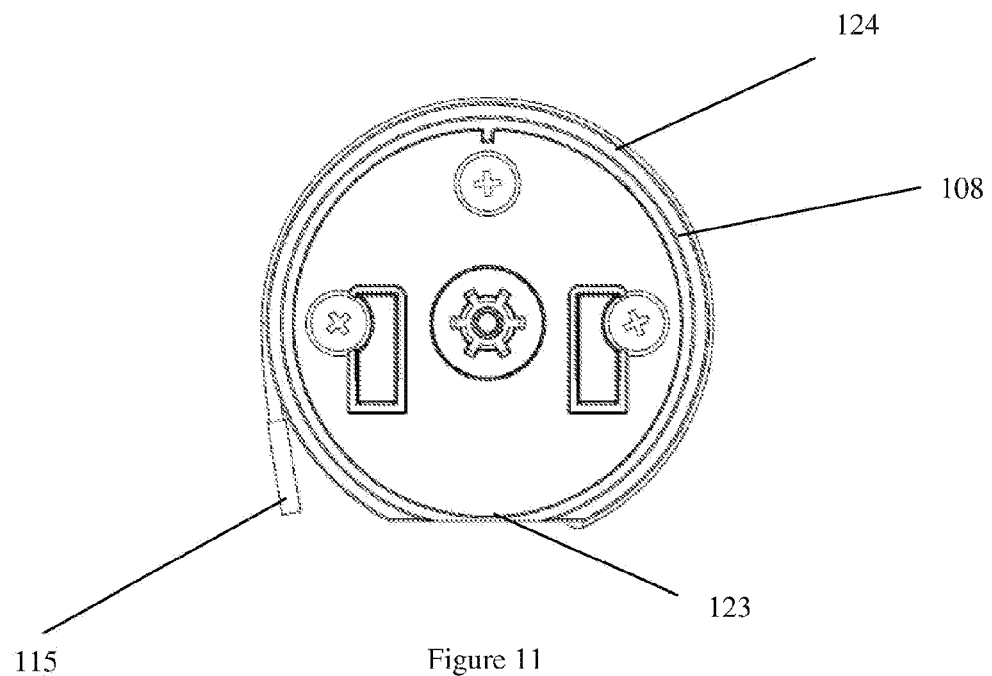
FIG. 11 shows a front view of the motor.
Figure 12:
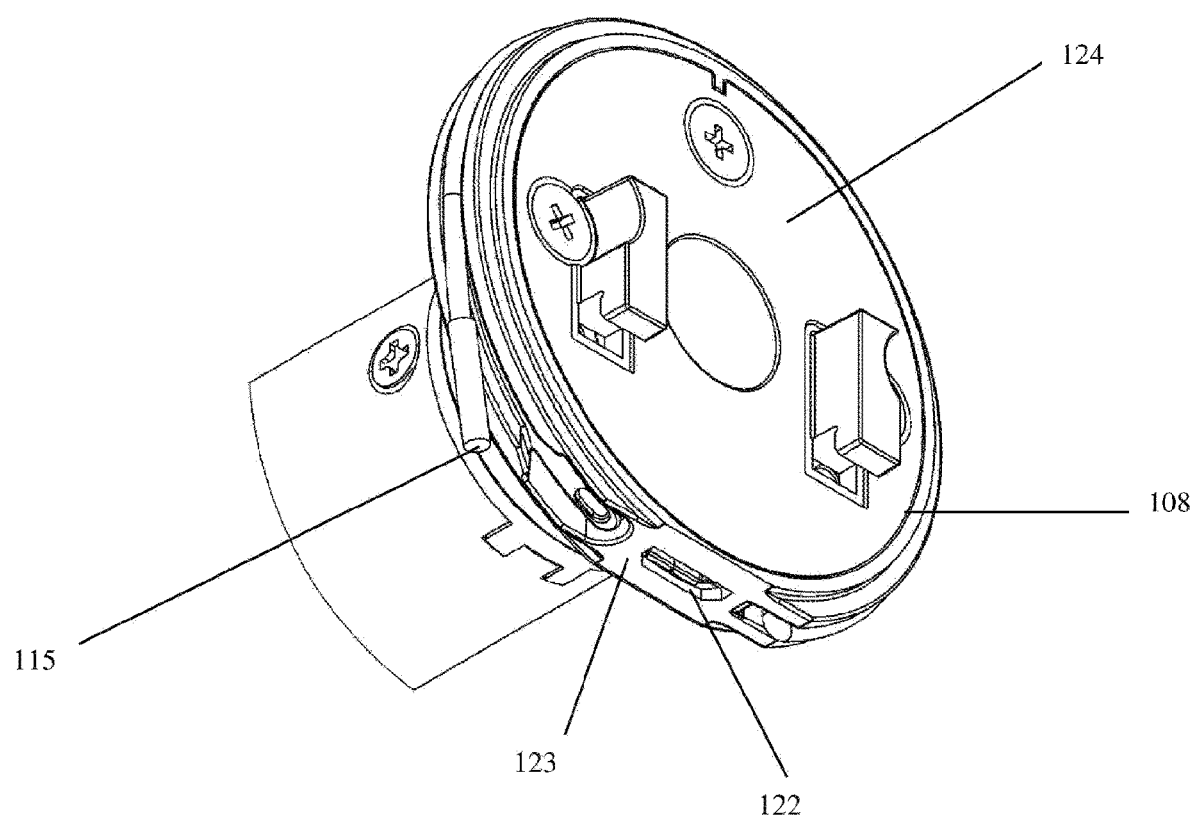
FIG. 12 shows another perspective view of the motor.

As will now be described with reference to FIGS. 9*a-b*, the blind system 100 includes a motor cover 118 for the circumferential head 124 of the motor 108. The cover 118 has a first 119, second 120 and third 121 resilient radially extending circumferential walls that are adapted to partially encircle the head 119. The third wall 121 is disposed between the first 119 and second 120 walls such that the first 119, second 120 and third 121 walls together define a generally U shaped cross section. In the disclosed embodiment, the cover 118 is C shaped and adapted to snap fit onto the motor head 119. As is shown in FIGS. 10-12, the motor 108 includes a USB charge port 122 that is located on the motor head 119 in a position that remains exposed when the cover 118 is positioned on the motor head 119. The USB port 122 is positioned on a flat edge 123 of the motor head 119. As blinds (and thus an associated motor) are installed high up (e.g. above a window) and or not always easy to access, the power supply port may not always be visible. Advantageously, the provision of a flat/planar edge 123 guides a user (e.g. the user's hand) to the location of the USB port 122 such that the port can be easily located by the user regardless of visibility.

The motor 108, cover 118 and adaptors 107*a-b* (each being separate components of the system) may together form a kit for retrofitting a blind system having a chain drive. In this embodiment, a plurality of adaptors (e.g. the plurality of adaptors shown in FIGS. 3 and 4) may be provided in the kit to suit known blind systems. In use, the installer is able to select the adaptor that suits the width of the chain drive being replaced such that the existing blind brackets do not need to be replaced or re-positioned (e.g. to suit the variation in width of the retrofitted system). The method of retrofitting a blind system 100 may include removing the chain winder from the blind system 100, connecting a motor 108 to the first end 103 of the rod 101 of the blind system 100 (e.g. by inserting the portion of the motor that may include the battery into the rod 101 such that the head 19 of the motor is positioned against the end of the rod 101) such that the motor 108 is able to rotate the spindle about the longitudinal axis B to extend and retract the blind in use, and mounting a suitable adaptor 107*a-e* to the first end 103 of the rod 101. Again, the selected adaptor 107*a-b* is configured to be enable the blind system 100 to be connected to the first bracket 105 without having to adjust the position of the first bracket 105 or opposing second bracket (not shown) on the surface (e.g. wall surface).

Figure 13:
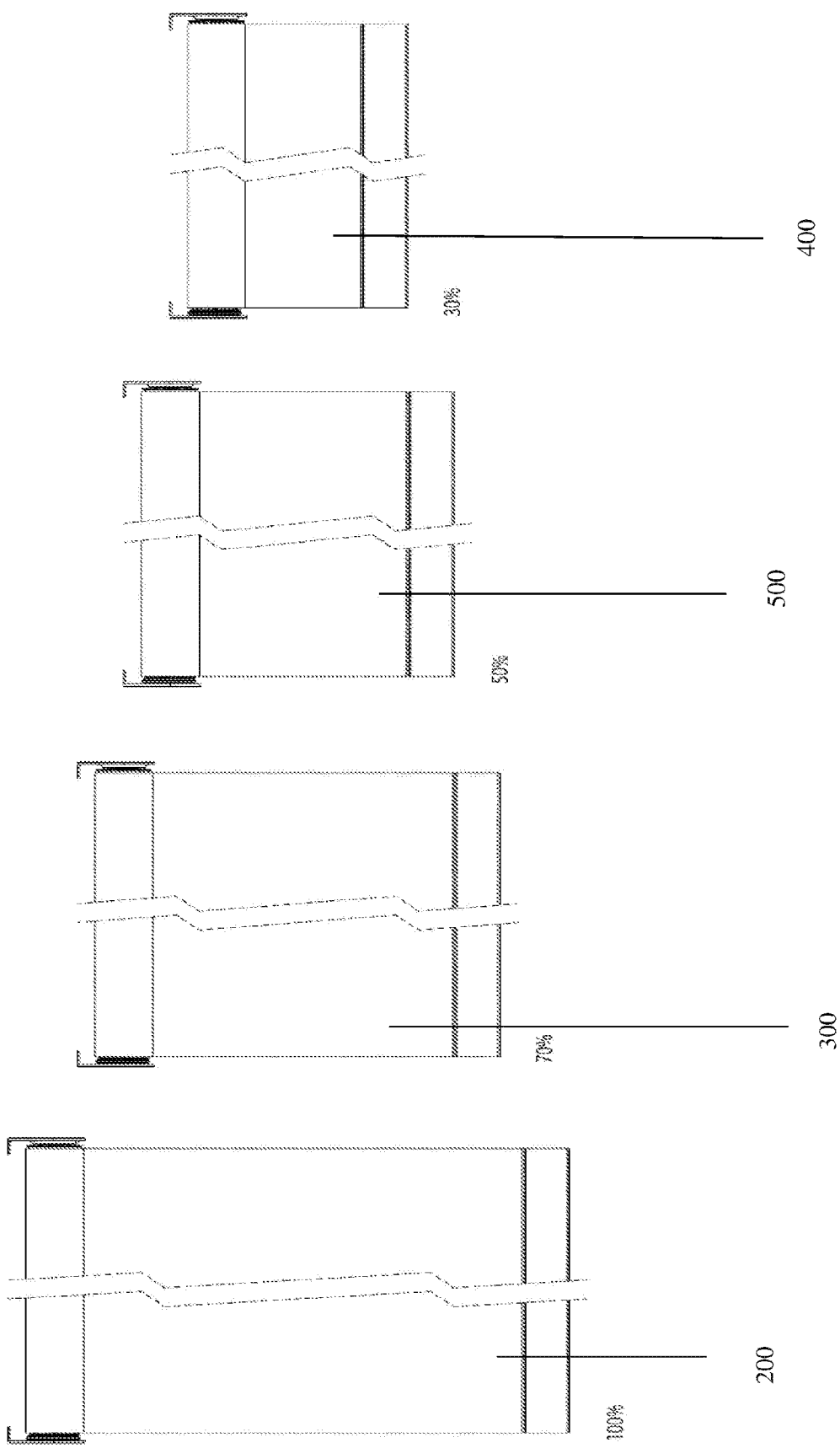
FIG. 13 shows front views of the blind system with the window covering at varying levels on extension.

Also disclosed herein (and in FIG. 13) is a system for automating the determination of battery level of a motor for a blind. The blind system is similar to that described in FIGS. 3 to 12 and is battery powered (i.e. not connected to mains power). The blind system includes a processor and memory storing instructions that, when executed by the processor, cause the system to determine a battery level of the battery and rotate the rod in dependence on the determined battery level to extend the blind towards a battery level indication position. As shown in FIG. 13, the battery level indication position is between the fully extended 200 and fully retracted (not shown) positions. The battery level indication position indicates to a user the determined battery level. For example, the position 200 represents to a user that the battery has full charge, the position 300 represents to a user that the battery has 70% charge, the position 400 represents to a user that the battery has 30% charge, and the position 500 represents to a user that the battery has 50% charge. The user may initiate the battery indication function from a handheld remote by pressing a button (e.g. a button to initiate the batter indication sequence). The motor will then respond and initiate a self-diagnostic battery level check and the motor will move the window covering based on the battery level to provide an indication of the batter level to the user. This feature is particularly useful in the event that a user (e.g. maintenance technician) needs to determine the charge level of several blind systems quickly. In one embodiment, a group of blind systems (e.g. several blinds located within a single room) may all respond to a single remote (e.g. a user can initiate a battery level check on several blinds at the same time by pressing a single button). In some forms, the user may retract the blind(s) fully before initiating the battery level check function.

The word 'comprising' and forms of the word 'comprising' as used in this description and in the claims does not limit the invention claimed to exclude any variants or additions.

Modifications and improvements to the invention will be readily apparent to those skilled in the art. Such modifications and improvements are intended to be within the scope of this invention.

The invention claimed is:

1. A blind system comprising:
    an elongate rod for supporting a blind, the rod extending along a longitudinal axis of the blind system between first and second ends of the rod, the first and second ends of the rod being configured to connect the blind system to first and second brackets respectively to support the blind system on a surface;
    a support positioned at the first end of the rod, the support being configured to mount the first end of the rod to the first bracket, the support having a head portion and a projecting portion, the projecting portion being connected to the head portion and extending from the head portion along the longitudinal axis towards the second end of the rod; and
    a motor connected to a spindle that is configured to rotate the rod about the longitudinal axis to extend and retract the blind in use, the motor being disposed at the first end of the rod and having a recess formed therein that is configured to receive the projecting portion of the support.

2. A blind system in accordance with claim 1, wherein the motor comprises a second recess that extends about a circumference of the motor, the second recess being configured to receive an antenna that is able to be wrapped around the motor such that it is positioned in the second recess of the motor.

3. A blind system in accordance with claim 2, wherein a button is disposed in the second recess, wherein the button is configured to turn the motor on and off upon depression of the button by a user.

4. A blind system in accordance with claim 1 wherein the motor comprises a circumferential head within which the recess is disposed, the system further comprising a cover for the motor, the cover comprising:
    a first radially extending circumferential wall adapted to partially encircle the head;
    a second radially extending circumferential wall adapted to partially encircle the head; and
    a third circumferential wall adapted to partially encircle the head, the third wall being disposed between the first and second walls to provide the cover with a generally U shaped cross section.

5. A blind system in accordance with claim 4, wherein the cover is C-shaped and adapted to snap fit onto the motor head.

6. A blind system in accordance with claim 5, wherein the motor comprises a USB charge port that is located on the motor head in a position that remains exposed when the cover is positioned on the motor head.

7. A kit for retrofitting a blind system, the blind system comprising an elongate rod for supporting a blind and a spindle configured to rotate the elongate rod, the rod extending along a longitudinal axis of the blind system between first and second ends of the rod, the first and second ends of the rod being configured to connect the blind system to first and second brackets respectively to support the blind system on a surface, the kit comprising:
    at least one support that is able to be connected at the first end of the rod, the at least one support being configured to mount the first end of the rod to the first bracket, the support having a head portion and a projecting portion, the projecting portion being connected to the head portion and extending from the head portion along the longitudinal axis towards the second end of the rod; and
    a motor able to be connected to the spindle to rotate the rod about the longitudinal axis to extend and retract the blind in use, the motor able to be disposed at the first end of the rod and having a recess formed therein that is configured to receive the projecting portion of the support.

8. A kit according to claim 7, wherein the kit comprises a plurality of said supports, wherein each of the plurality of supports have varying head portions to enable a suitable support to be selected to mount the first end of the rod to the first bracket without having to adjust the position of the first bracket on the surface.

9. A method of retrofitting a blind system, the blind system comprising an elongate rod for supporting a blind and a spindle connected to a chain winder that is configured to rotate the elongate rod, the rod extending along a longitudinal axis of the blind system between first and second ends of the rod, the first and second ends of the rod being configured to connect the blind system to first and second brackets respectively to support the blind system on a surface, the method comprising:
    removing the chain winder from the blind system;
    connecting a motor to the first end of the rod of the blind system such that the motor is able to rotate the spindle about the longitudinal axis to extend and retract the blind in use, the motor having a recess formed therein; and
    mounting a support at the first end of the rod, the support having a head portion configured to connect the blind system to the first bracket and a projecting portion, the projecting portion being connected to and extending from the head portion, the projecting portion being it is received in the recess of the motor.

10. A method in accordance with claim 9, further comprising selecting the support from a plurality of supports wherein each of the supports have a varying head portion, wherein the head portion of the support selected is configured to enable the blind system to be connected to the first bracket without having to adjust the position of the first bracket on the surface.

* * * * *